Patented Nov. 1, 1938

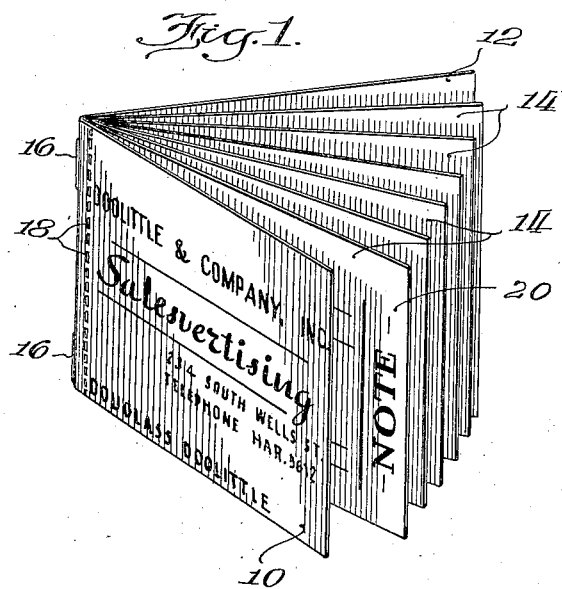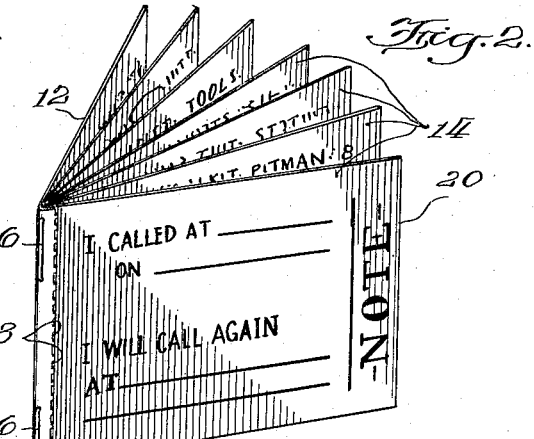

2,135,331

UNITED STATES PATENT OFFICE 2,135,331

ADVERTISING DEVICE

Douglass Doolittle, La Grange, Ill., assignor to Salesvertising Associates, Inc., Chicago, Ill., a corporation of Illinois Application September 10, 1936, Serial No. 100,134

3 Claims. (Cl. 283—56)

My invention relates generally to advertising devices, and more particularly to an improved form of business or calling card in which is incorporated advertising matter so that a salesman may unostentatiously hand to a prospective customer an advertising booklet as an incident to providing such prospective customer with his business card.

More particularly, I provide a booklet of the size and shape of an ordinary business card, in which the front cover forms a business card and is attached to the booklet by perforations so that it may be readily removed and preserved. Furthermore, there is provided an attention compelling notation upon the third page of the booklet which is visible at the edge of or through an opening in the card which forms the front cover of the booklet.

It is thus an object of my invention to provide an improved combined advertising booklet and calling or business card which may be used to perform the dual functions of the card and an advertising booklet.

Other objects will appear from the following description, reference being had to the accompanying drawing, in which:

Fig. 1 is a perspective view of the booklet;

Fig. 2 is a similar view showing the booklet after the front cover business card has been detached; and Fig. 3 is a perspective view of the card detached from the booklet.

As shown in Fig. 1, the combined business card and advertising booklet comprises a front cover 10 formed integrally with a back cover 12 and sheets 14 secured between the front and back cover by any suitable means, such as staples 16. The front cover 10 has imprinted thereon the conventional information of a calling or business card and is provided with a row of perforations 18 to facilitate detachment of the cover 10 from the remaining portion of the booklet. The detachable portion of the front cover preferably has the shape and appearance of a conventional business card.

The cover 10 is preferably slightly shorter than the remaining sheets of the booklet so as to reveal attention-arresting indicia 20 printed on the uncovered outer edge of the second sheet 14 (third page) of the booklet. The second sheet 14 of the booklet may, as shown in Fig. 2, have blanks to be filled in to indicate the time at which the caller made his call and the time at which he will make a subsequent call. It will be noted that the remaining sheets 14 have suitable advertising or informative material printed thereon.

The recipient of the combined business card and advertising booklet may, if he desires, detach the business card portion of front cover 10 of the booklet by tearing along the line of perforations 18, thereby leaving sufficient material of the front cover 10 of the booklet to form a binding for the edge thereof and to prevent the booklet from becoming disassembled. The business card may thus be removed by the recipient to be filed and preserved, while the advertising booklet may be perused and filed according to its subject matter, or destroyed. The fact that attention inviting indicia is placed upon a portion of the second sheet of the booklet which is exposed to view even though the booklet is closed, usually arouses the curiosity or interest of the recipient of the booklet sufficiently to cause him to look at the remainder of the booklet.

I have found that in the use of this combined business card and advertising booklet the person receiving the same invariably glances through the advertising material of the pamphlet incidental to looking at the business card, and his interest in the caller and the business of the caller is thereby stimulated so that the caller is given an opportunity to present his sales talk under favorable circumstances.

What I claim and desire to secure by Letters Patent of the United States is:

1. A combined calling card and advertising booklet comprising a booklet having a relatively stiff front cover bearing indicia constituting said cover a calling card, said cover being detachably secured to the remaining portion of the booklet, said front cover being of smaller size than the remaining sheets of the booklet, thereby to expose a marginal portion of another page of the booklet when the booklet is in closed condition, and indicia carried by said exposed portion designed to arouse the interest of a recipient in the other pages of said booklet.

2. A combined calling card and advertising booklet comprising, a plurality of sheets of paper having indicia thereon conveying advertising information, a cover sheet, and binding means for permanently securing all of said sheets together, part of the front cover portion of said cover sheet bearing indicia to make it usable as a business card said front cover portion being detachably secured to the remaining portion of said cover sheet whereby said business card part of said cover sheet may be detached without disturbing said binding means, and said cover being of smaller size than the remaining sheets of the booklet, thereby to expose a marginal portion of another page of the booklet when said booklet is in closed condition.

3. An article of manufacture comprising a plurality of coextensive sheets bound together to form leaves having advertising indicia thereon, and a relatively stiff front cover for said leaves secured thereto and being of lesser area than said sheets so that a portion of the topmost of said sheets extends beyond the border of said cover when said cover is closed over said sheets, said cover being weakened along a severance line for detachment to serve as a business card with indicia printed thereon for that purpose, and said portion of the topmost sheet which extends beyond the border of said cover bearing indicia designed to arouse the interest of a recipient in said advertising indicia.

DOUGLASS DOOLITTLE.